(12) United States Patent
Lee et al.

(10) Patent No.: US 7,230,671 B2
(45) Date of Patent: Jun. 12, 2007

(54) METHOD FOR FABRICATING LIQUID CRYSTAL DISPLAY

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 120 days.

(21) Appl. No.: 10/184,117

(22) Filed: Jun. 28, 2002

(65) Prior Publication Data

US 2003/0147039 A1 Aug. 7, 2003

(30) Foreign Application Priority Data

Feb. 5, 2002 (KR) ............................... P2002-6414

(51) Int. Cl.
G02F 1/13 (2006.01)

(52) U.S. Cl. ...................... 349/187; 349/189; 349/190

(58) Field of Classification Search ................ 349/187, 349/189, 190, 153, 154, 155, 166, 191
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,307,190 A * | 4/1994 | Wakita et al. ............... 349/158 |
| 5,379,139 A | 1/1995 | Sato et al. |
| 5,406,989 A | 4/1995 | Abe |
| 5,410,423 A * | 4/1995 | Furushima et al. ......... 349/190 |
| 5,499,128 A | 3/1996 | Hasegawa et al. |
| 5,507,323 A | 4/1996 | Abe |
| 5,511,591 A | 4/1996 | Abe |
| 5,517,344 A * | 5/1996 | Hu et al. ..................... 349/153 |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato |
| 5,952,678 A | 9/1999 | Ashida |

(Continued)

FOREIGN PATENT DOCUMENTS

| | | |
|---|---|---|
| EP | 1 003 066 A1 | 5/2000 |
| EP | 1003066 A1 | 5/2000 |
| JP | 51-65056 | 6/1976 |

(Continued)

*Primary Examiner*—Steven S. Paik
(74) *Attorney, Agent, or Firm*—McKenna Long & Aldridge LLP

(57) ABSTRACT

Method for fabricating an LCD by a liquid crystal dropping method applied thereto including the steps of loading a first substrate having liquid crystal dropped thereon and a second substrate having sealant coated thereon on a bonding chamber, bonding the first and second substrate with a varied pressure, and unloading the bonded first and second substrates.

34 Claims, 8 Drawing Sheets

U.S. PATENT DOCUMENTS

| | | | |
|---|---|---|---|
| 5,956,112 A | 9/1999 | Fujimori et al. | |
| 5,959,712 A * | 9/1999 | Morii et al. | 349/190 |
| 5,963,287 A * | 10/1999 | Asada et al. | 349/150 |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 * | 10/2001 | Egami et al. | 349/189 |
| 6,337,730 B1 | 1/2002 | Ozaki et al. | |
| 6,414,733 B1 | 7/2002 | Ishikawa et al. | |
| 6,440,864 B1 * | 8/2002 | Kropewnicki et al. | 438/710 |
| 2001/0021000 A1 | 9/2001 | Egami | |
| 2002/0008838 A1 | 1/2002 | Matsuda | |

FOREIGN PATENT DOCUMENTS

| | | |
|---|---|---|
| JP | 51-065656 | 6/1976 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 6034983 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | G08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073096 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 10-123537 | 5/1998 |
| JP | 10-123538 | 5/1998 |
| JP | 10-142616 | 5/1998 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |
| JP | 10-221700 | 8/1998 |
| JP | 10221700 | 8/1998 |
| JP | 10282512 | 10/1998 |
| JP | 10-333157 | 12/1998 |
| JP | 10-333159 | 12/1998 |
| JP | 11-014953 | 1/1999 |
| JP | 11014953 | 1/1999 |
| JP | 11-038424 | 2/1999 |
| JP | 11038424 | 2/1999 |
| JP | 11-064811 | 3/1999 |

| | | | | | |
|---|---|---|---|---|---|
| JP | 11064811 | 3/1999 | JP | 2001-272640 | 10/2001 |
| JP | 11-109388 | 4/1999 | JP | 2001-281675 | 10/2001 |
| JP | 11109388 | 4/1999 | JP | 2001-281678 | 10/2001 |
| JP | 11-133438 | 5/1999 | JP | 2001-282126 | 10/2001 |
| JP | 11-142864 | 5/1999 | JP | 2001-305563 | 10/2001 |
| JP | 11-174477 | 7/1999 | JP | 2001-330837 | 11/2001 |
| JP | 11174477 | 7/1999 | JP | 2001-330840 | 11/2001 |
| JP | 11-212045 | 8/1999 | JP | 2001330840 | 11/2001 |
| JP | 11212045 | 8/1999 | JP | 2001-356353 | 12/2001 |
| JP | 11-248930 | 9/1999 | JP | 2001-356354 | 12/2001 |
| JP | H11-262712 | 9/1999 | JP | 2001356354 | 12/2001 |
| JP | H11-264991 | 9/1999 | JP | 2002-014360 | 1/2002 |
| JP | 11-326922 | 11/1999 | JP | 2002-023176 | 1/2002 |
| JP | 11-344714 | 12/1999 | JP | 2002014360 | 1/2002 |
| JP | 11344714 | 12/1999 | JP | 2002023176 | 1/2002 |
| JP | 2000-002879 | 1/2000 | JP | 2002-049045 | 2/2002 |
| JP | 2000-029035 | 1/2000 | JP | 2002049045 | 2/2002 |
| JP | 2000029035 | 1/2000 | JP | 2002-079160 | 3/2002 |
| JP | 2000-056311 | 2/2000 | JP | 2002-080321 | 3/2002 |
| JP | 2000-066165 | 3/2000 | JP | 2002-082340 | 3/2002 |
| JP | 2000-066218 | 3/2000 | JP | 2002-090759 | 3/2002 |
| JP | 2000-093866 | 4/2000 | JP | 2002-090760 | 3/2002 |
| JP | 2000-137235 | 5/2000 | JP | 2002082340 | 3/2002 |
| JP | 2000-147528 | 5/2000 | JP | 2002090759 | 3/2002 |
| JP | 3000-147528 | 5/2000 | JP | 2002090760 | 3/2002 |
| JP | 2000-193988 | 7/2000 | JP | 2002-107740 | 4/2002 |
| JP | 2000-241824 | 9/2000 | JP | 2002-122870 | 4/2002 |
| JP | 2000-284295 | 10/2000 | JP | 2002-122872 | 4/2002 |
| JP | 2000-292799 | 10/2000 | JP | 2002-122873 | 4/2002 |
| JP | 2000-310759 | 11/2000 | JP | 2002107740 | 4/2002 |
| JP | 2000-310784 | 11/2000 | JP | 2002122872 | 4/2002 |
| JP | 2000310759 | 11/2000 | JP | 2002122873 | 4/2002 |
| JP | 2000-338501 | 12/2000 | JP | 2002-131762 | 5/2002 |
| JP | 2001-005401 | 1/2001 | JP | 2002-139734 | 5/2002 |
| JP | 2001-005405 | 1/2001 | JP | 2002-156518 | 5/2002 |
| JP | 2001-013506 | 1/2001 | JP | 2002-169166 | 6/2002 |
| JP | 2001-033793 | 2/2001 | JP | 2002-169167 | 6/2002 |
| JP | 2001-042341 | 2/2001 | JP | 2002-182222 | 6/2002 |
| JP | 2001-051284 | 2/2001 | JP | 2002080321 | 6/2002 |
| JP | 2001042341 | 2/2001 | JP | 2002-202512 | 7/2002 |
| JP | 2001-066615 | 3/2001 | JP | 2002-202514 | 7/2002 |
| JP | 2001-091727 | 4/2001 | JP | 2002-214626 | 7/2002 |
| JP | 2001-117105 | 4/2001 | JP | 2002202512 | 7/2002 |
| JP | 2001-117109 | 4/2001 | JP | 2002202514 | 7/2002 |
| JP | 2001117105 | 4/2001 | JP | 2002214626 | 7/2002 |
| JP | 2001-133745 | 5/2001 | JP | 2002-229042 | 8/2002 |
| JP | 2001-133794 | 5/2001 | JP | 2002-236276 | 8/2002 |
| JP | 2001-133799 | 5/2001 | JP | 2002-258299 | 8/2002 |
| JP | 2001-142074 | 5/2001 | JP | 2002-236292 | 9/2002 |
| JP | 2001-147437 | 5/2001 | JP | 2002-277865 | 9/2002 |
| JP | 2001133794 | 5/2001 | JP | 2002-277866 | 9/2002 |
| JP | 2001142074 | 5/2001 | JP | 2002-277881 | 9/2002 |
| JP | 2001147437 | 5/2001 | JP | 2002-287156 | 10/2002 |
| JP | 2001-154211 | 6/2001 | JP | 2002-296605 | 10/2002 |
| JP | 2001-166272 | 6/2001 | JP | 2002-311438 | 10/2002 |
| JP | 2001-166310 | 6/2001 | JP | 2002-311440 | 10/2002 |
| JP | 2001154211 | 6/2001 | JP | 2002-311442 | 10/2002 |
| JP | 2001-183683 | 7/2001 | JP | 2002-323687 | 11/2002 |
| JP | 2001-201750 | 7/2001 | JP | 2002-323694 | 11/2002 |
| JP | 2001-209052 | 8/2001 | JP | 2002-333628 | 11/2002 |
| JP | 2001-209056 | 8/2001 | JP | 2002-333635 | 11/2002 |
| JP | 2001-209057 | 8/2001 | JP | 2002-333843 | 11/2002 |
| JP | 2001-209058 | 8/2001 | JP | 2002-341329 | 11/2002 |
| JP | 2001-209060 | 8/2001 | JP | 2002-341355 | 11/2002 |
| JP | 2001-215459 | 8/2001 | JP | 2002-341356 | 11/2002 |
| JP | 2001-222017 | 8/2001 | JP | 2002-341357 | 11/2002 |
| JP | 2001-235758 | 8/2001 | JP | 2002-341358 | 11/2002 |
| JP | 2001-215459 | 9/2001 | JP | 2002-341359 | 11/2002 |
| JP | 2001-255542 | 9/2001 | JP | 2002-341362 | 11/2002 |
| JP | 2001-264782 | 9/2001 | KR | 2000-0035302 | 6/2000 |
| JP | 2001255542 | 9/2001 | KR | 2000-0035302 A1 | 6/2000 |
| JP | 2001264782 | 9/2001 | | | |
| JP | 2001-201750 | 10/2001 | * cited by examiner | | |

METHOD FOR FABRICATING LIQUID CRYSTAL DISPLAY

This application claims the benefit of Korean Patent Application No. P2002-6414 filed on Feb. 5, 2002, which is hereby incorporated by reference as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD), and more particularly, to fabricating an LCD incorporating a liquid crystal dispensing method applied thereto.

2. Discussion of the Related Art

In general, recent developments in the information communication field have increased demand for various types of display devices. In response to this demand, various flat panel displays such as liquid crystal display (LCD), plasma display panel (PDP), electro luminescent display (ELD), and vacuum fluorescent display (VFD) have been developed, some of which have been employed as displays in various products.

The LCDs have been used most widely as mobile displays while replacing the CRT (Cathode Ray Tube) because of features and advantages including excellent picture quality, lightweight, thin profile, and low power consumption. In addition to the mobile type LCDs, such as a display for a notebook computer, LCDs have been developed for computer monitors and televisions to receive and display broadcasting signals.

Despite various technical developments in the LCD technology with applications in different fields, research in enhancing the picture quality of the LCD as a display has been in some respects lacking as compared to other features and advantages of the LCD. Therefore, to use the LCD in various fields as a general display, the key to developing the LCD lies on whether the LCD can implement a high quality picture, such as high resolution and high luminance with a large-sized screen while still maintaining lightweight, thin profile, and low power consumption.

The LCD is provided with a liquid crystal panel for displaying a picture, and a driving part for applying a driving signal to the liquid crystal panel. The liquid crystal panel has first and second glass substrates bonded together with a gap between the substrates. A liquid crystal layer is formed by injecting liquid crystal between the first and second glass substrates.

On the first glass substrate (a thin film transistor array substrate, for example), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines arranged in a matrix, a plurality of thin film transistors (TFTs) switchable in response to a signal on the gate lines for transmission of a signal on the data line to the pixel electrodes.

The second glass substrate (a color filter substrate, for example) has a black matrix layer for shielding light from areas excluding the pixel regions, a color filter layer (R, G, B), and a common electrode for implementing a picture.

The foregoing first and second substrates have a gap between them which is maintained by spacers, and bonded by a sealant. The seal has a liquid crystal injection inlet through which the liquid crystal is injected after the two substrates are bonded and sealed.

After the individual liquid crystal display panels are cut, the space between the bonded two substrates of each LCD panel is evacuated and the liquid crystal injection inlet is dipped in a liquid crystal bath, so that the liquid crystal is injected into the space by a capillary tube phenomenon. Once the liquid crystal is injected into the space between the two substrates, the liquid crystal injection inlet is sealed by the sealant.

However, the related art method for fabricating an LCD having liquid crystal injected therein has the following problems. First, the related art method has a poor productivity because the dipping of the liquid crystal injection inlet in a liquid crystal bath while the space between the two substrates are maintained at a vacuum after the unit panels are cut into individual pieces for injection of the liquid crystal takes much time. Second, the liquid crystal injection for a large LCD, in particular, may cause imperfect or non-uniform filling of the liquid crystal in the panel, which may result in a defective panel. Third, the complicated and lengthy fabrication process requires the use of many liquid crystal injection devices, which occupies much space.

Accordingly, a method for fabricating an LCD by using a liquid crystal dropping method has been under research recently. A Japanese laid-open patent publication No. 2000-147528 discloses the following liquid crystal dispensing or dropping method.

A related art method for fabricating an LCD by using the foregoing liquid crystal dropping method will be explained referring to FIGS. 1A–1F.

Referring to FIG. 1A, UV sealant 1 is coated on a first glass substrate 3 having a thin film transistor array formed thereon to a thickness of approximately 30 μm, and liquid crystal 2 is dropped on an interior of the sealant 1, which is the thin film transistor array area. No liquid crystal injection inlet is provided in the sealant 1.

The first glass substrate 3 is mounted on a table 4 in a vacuum container 'C' which is movable in a horizontal direction, and held by vacuum on the bottom surface of the first glass substrate 3 by a first plurality of vacuum holes 5.

Referring to FIG. 1B, the bottom surface of the second glass substrate 6 having a color filter array formed thereon is held by vacuum using a second plurality of vacuum holes 7. The vacuum container 'C' is closed and evacuated. The second glass substrate 6 is moved downward in a vertical direction until a gap between the first substrate 3 and second glass substrate 6 is 1 mm. The table 4 supporting first glass substrate 3 thereon is moved in a horizontal direction to pre-align the first and second glass substrates 3 and 6 with respect to each other.

Referring to FIG. 1C, the second glass substrate 6 is moved downward until the second glass substrate 6 comes into contact with the liquid crystal 2 or the sealant 1. Referring to FIG. 1D, the table 4 with the first glass substrate 3 thereon is moved in a horizontal direction to align the first and second glass substrates 3 and 6. Referring to FIG. 1E, the second glass substrate 6 is moved further down until the second glass substrate 6 bonds with the first glass substrate 3 through the sealant 1. The second glass substrate 6 is pressed down further until the gap between the second glass substrate 6 and the first glass substrate 3 becomes 5 μm.

Referring to FIG. 1F, the pre-bonded first and second glass substrates 3 and 6 are taken out of the vacuum container 'C', and a UV ray is directed to the sealant to set the sealant 1, thereby completing the fabrication process.

However, the foregoing related art method for fabricating an LCD having the liquid crystal dropping method applied thereto has the following problems.

First, coating the sealant and dropping the liquid crystal on the same substrate requires much fabrication time before the two substrates can be bonded to each other.

Second, as the sealant is coated and the liquid crystal is dropped on the first substrate while the second substrate sits idle, there is an unbalance of a fabrication process between the first and second substrates, resulting in an ineffective operation of the production line.

Third, because the sealant is coated and the liquid crystal is dropped on the first substrate, the first substrate cannot be cleaned using an ultrasonic cleaner (USC), for example. Therefore, as the sealant that will bond the two substrates should not be removed, undesirable particles also cannot be removed which may cause defective contact of the sealant in the bonding.

SUMMARY OF THE INVENTION

Accordingly, the present invention is directed to a liquid crystal display (LCD) and a method for fabricating a liquid crystal display that substantially obviates one or more of the problems due to limitations and disadvantages of the related art.

An advantage of the present invention is the provision of a method for fabricating an LCD having a liquid crystal dropping method applied thereto, which reduces the fabrication time of the LCD and increases the efficiency, to improve productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for fabricating an LCD includes loading in a bonding chamber a first substrate having liquid crystal applied thereon and a second substrate having a sealant coated thereon, bonding the first and second substrates using varied pressure, and unloading the bonded first and second substrates.

The loading step preferably includes holding the first substrate and the second substrate at a lower stage and an upper stage in the bonding chamber respectively, moving a substrate receiver in the bonding chamber into position below the second substrate, evacuating the bonding chamber, and securing the first and second substrates to the lower and upper stages by electrostatic charge (ESC), respectively.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1A:
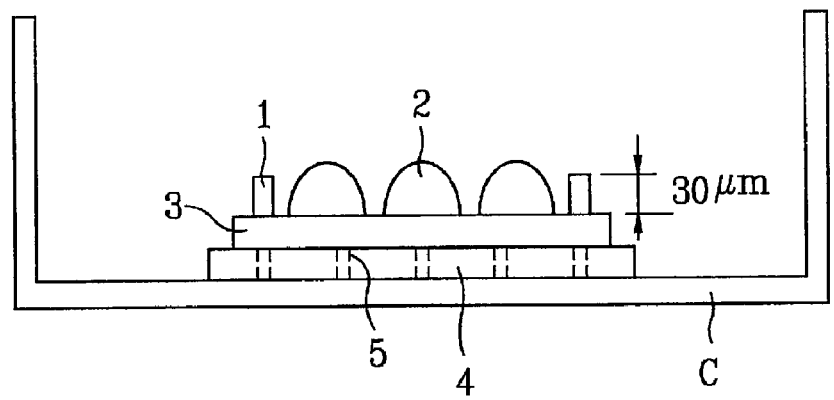
FIGS. 1A–1F illustrate steps of a related art method for fabricating an LCD having a liquid crystal dropping method applied thereto.
Figure 1B:
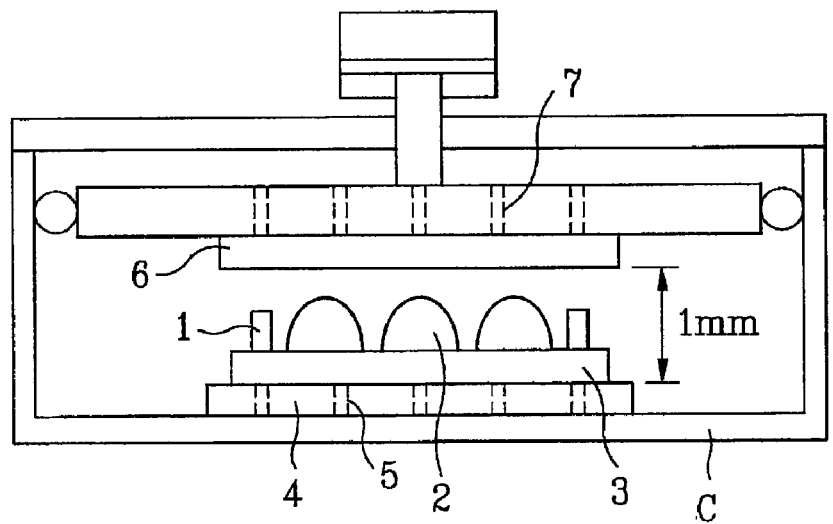
Figure 1C:
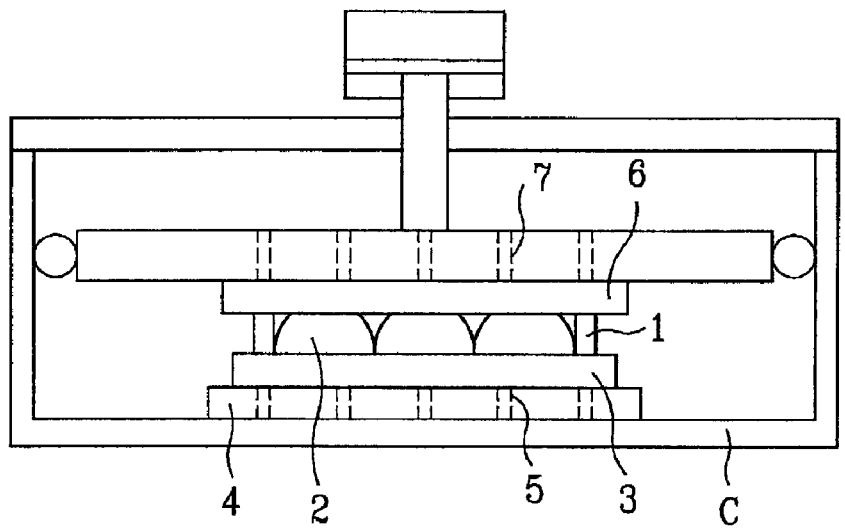
Figure 1D:
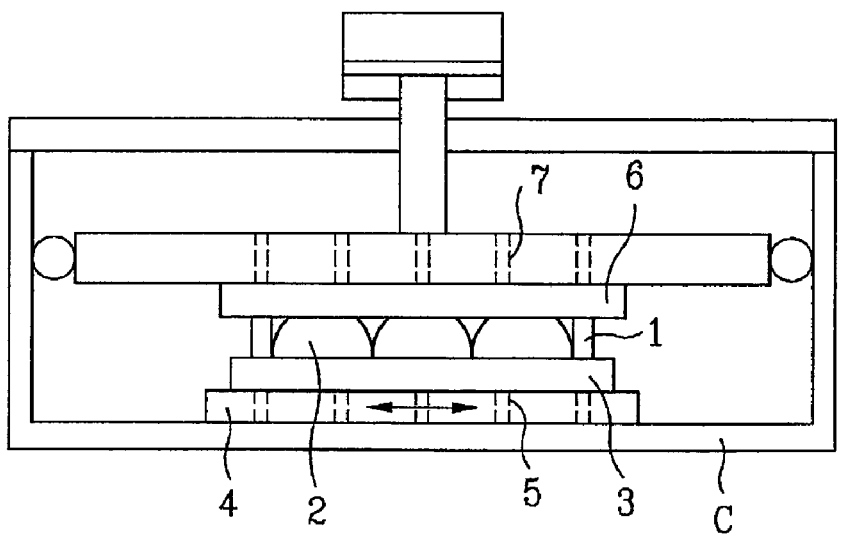
Figure 1E:
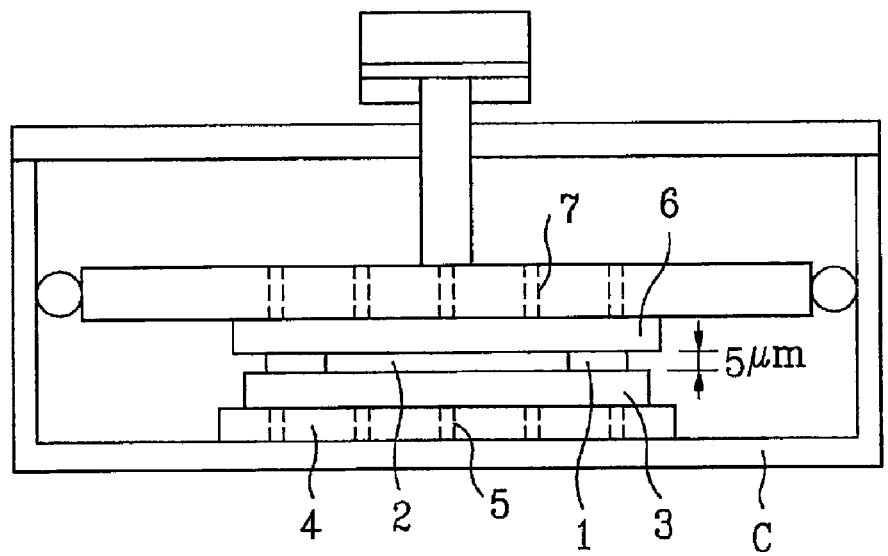
Figure 1F:
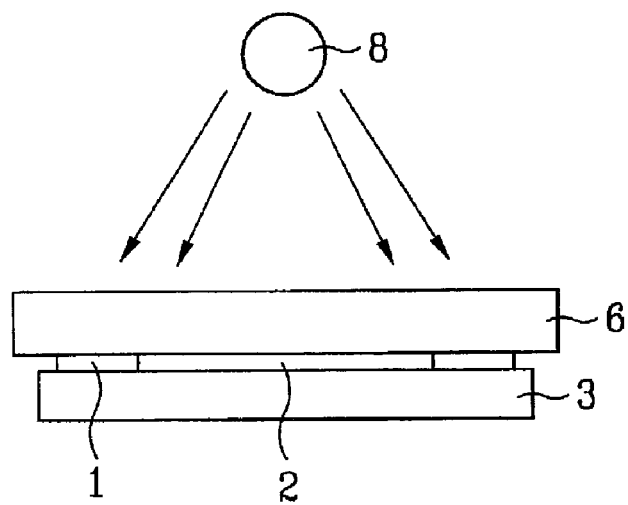
Figure 2:
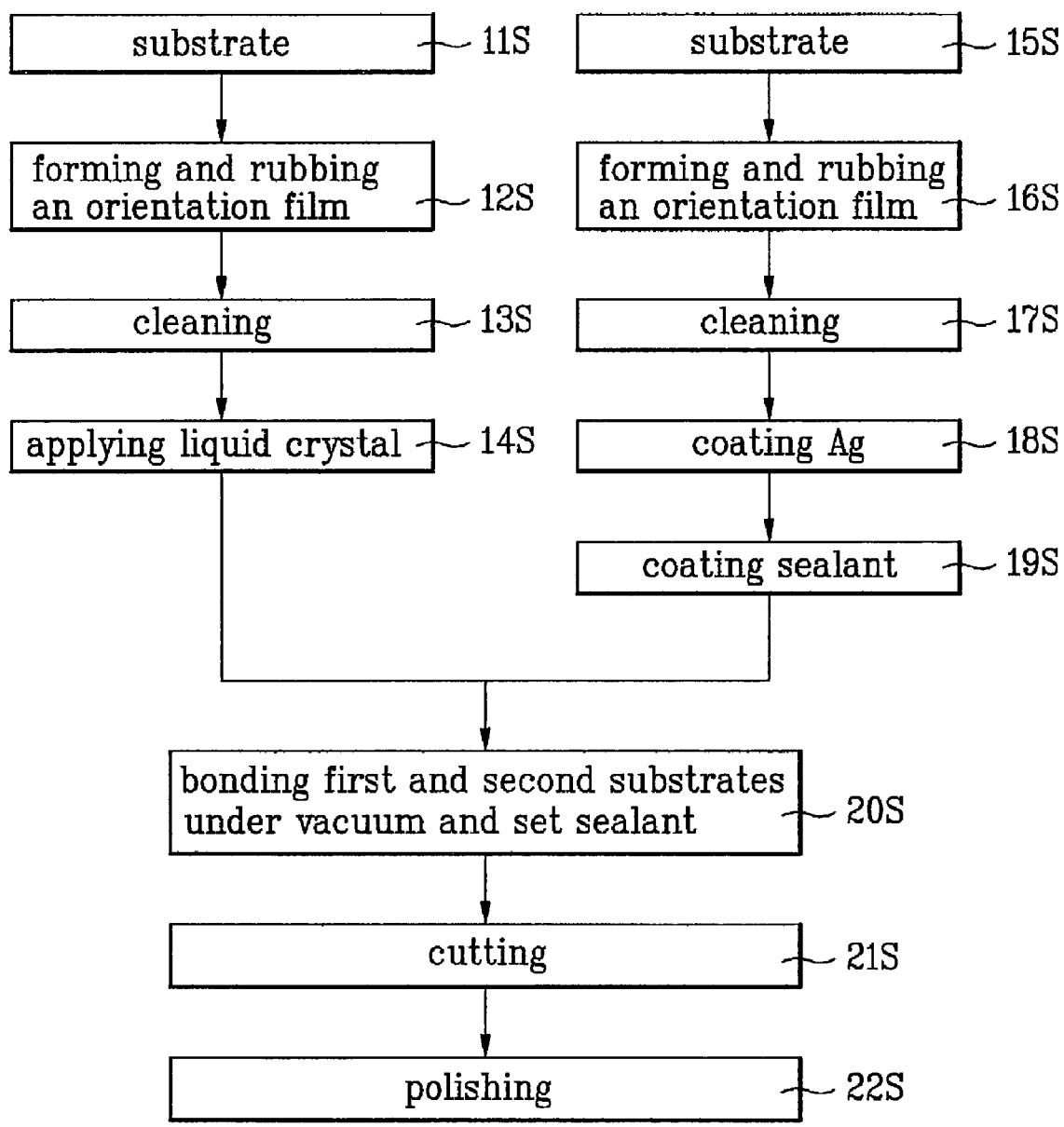
FIG. 2 illustrates a flowchart showing the method steps for fabricating an LCD in accordance with a preferred embodiment of the present invention.

FIG. 2 illustrates a flowchart showing method steps for fabricating an LCD in accordance with a preferred embodiment of the present invention, and FIGS. 3A–3E illustrate method steps for fabricating an LCD in accordance with a preferred embodiment of the present invention.

Referring to FIG. 2, a plurality of panels are designed on a first glass substrate 11 and a thin film transistor array is formed on each panel (11S), and a first orientation or alignment film is formed on an entire surface of the first glass substrate 11. Then, a rubbing process (12S) is performed. Instead of the rubbing process, a UV alignment process may be performed.

It should be noted that in a single glass substrate, multiple panels may be formed or one large panel may be formed. For example, in a 1.0 meter×1.2 meter glass substrate, 15 panels of about 15 inches each may be formed simultaneously. Many other panel sizes may be formed but the number of panels will differ. For example, in the same size glass substrate (1.0 m×1.2 m), 6 panels of 18 inches may be formed. Even a large panel size of 40 inches or more may be formed on the 1.0 m×1.2 m glass substrate.

A plurality of panels are designed on a second glass substrate 13 corresponding to the panels on the first glass substrate 11, to form a color filter array on each panel (15S). The color filter array includes such elements as a black matrix layer, a color filter layer, and a common electrode. A second orientation or alignment film is formed on an entire surface of the second substrate 13 and the second orientation film undergoes a rubbing process (16S) similar to the first orientation film. A UV alignment process may replace the rubbing process.

The first and second glass substrates 11 and 13 thus formed are cleaned, respectively (13S and 17S).

Figure 3A:
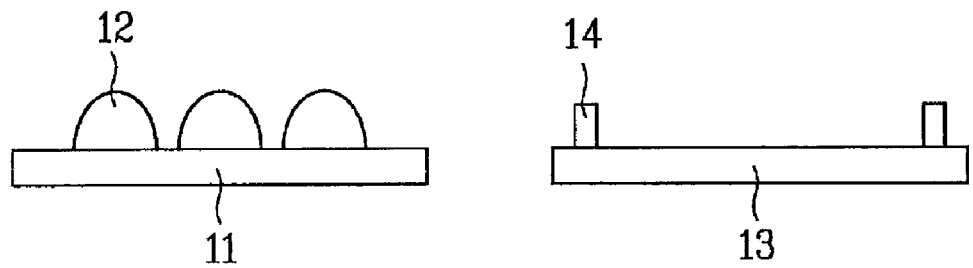
FIGS. 3A–3E illustrate steps of a method for fabricating an LCD in accordance with a preferred embodiment of the present invention.

Referring to FIG. 3A, liquid crystal 12 is dropped or applied on the first glass substrate 11 which has been cleaned (14S). Silver (Ag) dots are formed on the cleaned second glass substrate 13 (18S), as well as a sealant 14 (19S).

The first and second glass substrates 11 and 13 are loaded in a vacuum bonding chamber 10, and bonded to spread the applied liquid crystal between the first and second substrates uniformly. Then, the sealant is hardened (20S).

The bonded first and second glass substrates 11 and 13 are cut into individual panels (21S). Each panel is polished and inspected (S22).

Figure 4:
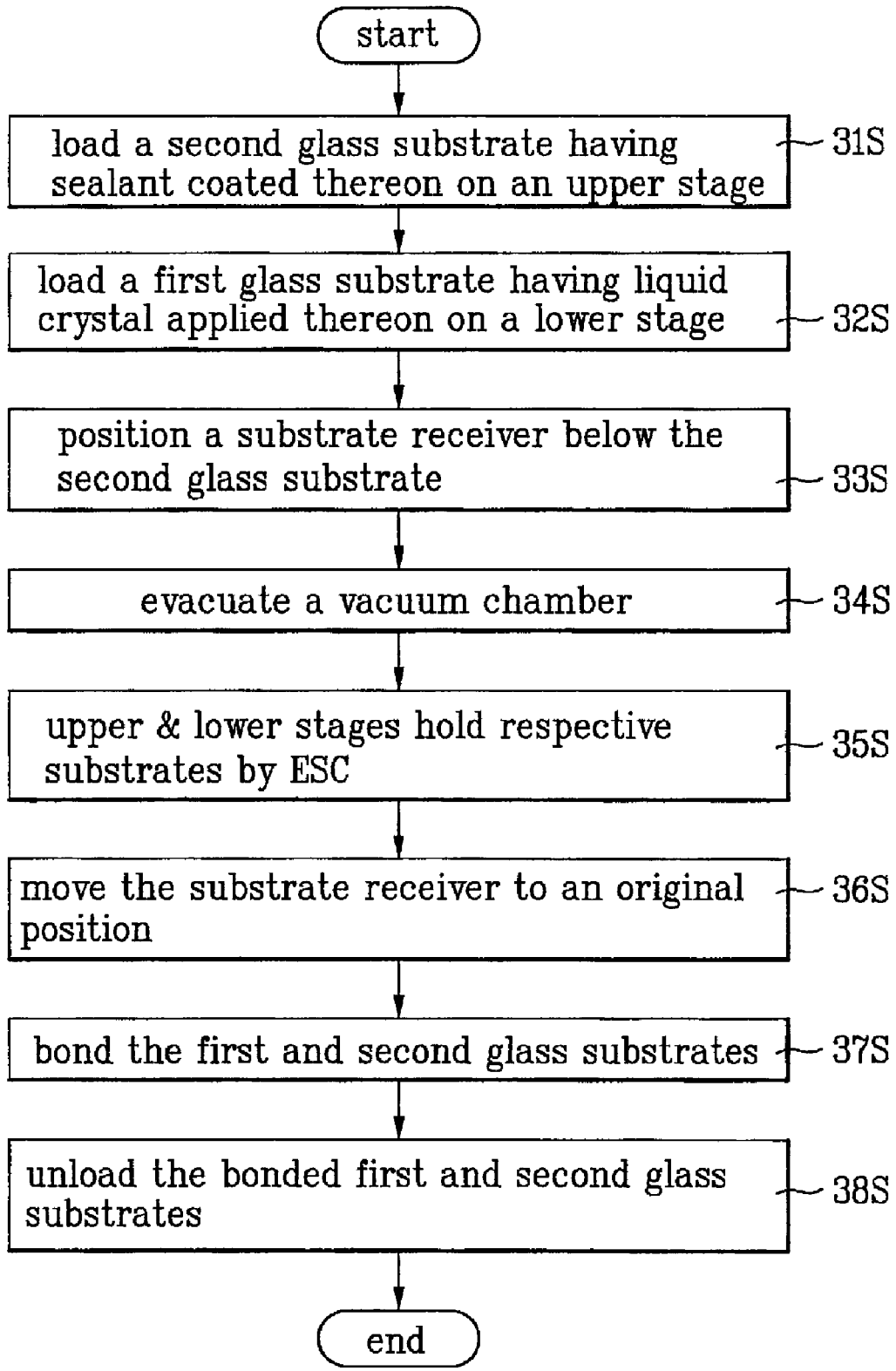
FIG. 4 illustrates a flowchart showing the bonding steps of the present invention.

The bonding process will be explained in more detail. FIG. 4 illustrates a flowchart showing the bonding steps of the present invention.

The bonding process includes the step of loading the two substrates in the vacuum bonding chamber, bonding the two substrates, and unloading the bonded substrates from the vacuum bonding chamber.

Although a plurality of panels may be formed for a single glass substrate, a single panel may also be formed to maximize the size of the display, as explained earlier.

Before loading the substrates, the second glass substrate 13 having the sealant 14 coated thereon maybe cleaned using the ultra sonic cleaner (USC), for example, for removing undesired particles formed during fabrication. Since the second glass substrate 13 has the sealant and the Ag dots coated thereon and no liquid crystal applied thereon, the second glass substrate 13 can be cleaned.

Figure 3B:
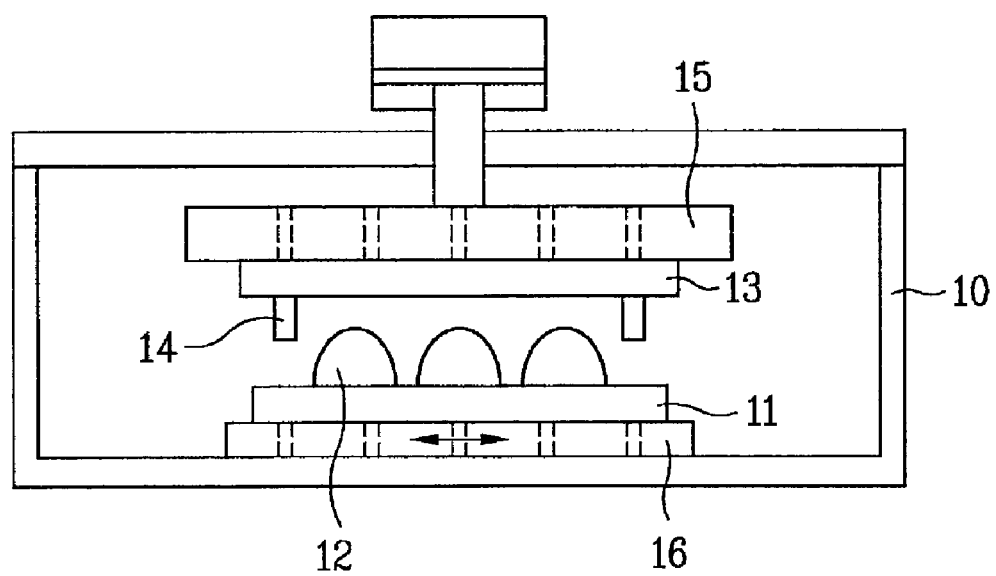

Referring to FIG. 3B, in the loading step, the second glass substrate 13 having the sealant 14 coated thereon is held by an upper stage 15 by a vacuum chuck, for example, in the vacuum bonding chamber 10 with the coated sealant facing downward (31S). Before the second glass substrate 13 is loaded in the bonding chamber 10, the substrate 13 is flipped over so that the surface with the sealant 14 will face downward. The first and second substrates may be held by the lower and upper substrates, respectively, by several suitable mechanisms including a vacuum chuck and electrostatic charge (ESC).

The second glass substrate 13 has sealant 14 coated thereon and is held by a loader portion of a robot (not shown) and the sealant 14 coating faces downward as it is brought in the vacuum bonding chamber 10. Next, the upper stage 15 in the vacuum bonding chamber 10 is moved vertically downward or the second glass substrate 13 may be moved vertically upward by the lower stage 16, for example. In addition, utilizing the vacuum chuck or electrostatic charge (ESC) the first and second substrates are held by the lower and upper stages. Other suitable mechanisms may be used to hold the substrates by the stages.

The robot loader is then moved out of the vacuum bonding chamber 10 and the first glass substrate 11 is arranged over the lower stage 16 by the robot loader.

Although it has been explained that the liquid crystal 12 is dispensed on the first glass substrate 11 having the thin film transistor array, and the sealant is coated on the second glass substrate 13, having the color filter array, the sealant may be coated on the first glass substrate 11 and the liquid crystal may be dispensed on the second substrate 13. In the alternative, the sealant may be applied to both substrates, or the liquid crystal dropping and the sealant coating may be made on either of the two glass substrates, as long as the substrate with the liquid crystal material is located at the lower stage and the other substrate is located at the upper stage.

After the first and second substrates are held by a vacuum chuck, for example, to the lower and upper stages, the first and second substrates may be aligned with each other.

Next, a substrate receiver (not shown) for holding the second glass substrate is positioned to contact the surface of the second glass substrate 13 (33S) that is facing down by placing the substrate receiver under the second glass substrate 13 and moving either the upper stage down, the substrate receiver up, or both, until the downward facing surface of the second glass substrate 13 contacts the substrate receiver.

The substrate receiver is positioned below the second glass substrate 13, to prevent the second glass substrate held by the upper stage from becoming detached from the upper stage when the bonding chamber 10 is under vacuum. In particular, when the bonding chamber 10 is under vacuum, the vacuum force holding the second substrate onto the upper stage by the vacuum chuck loses its strength. Thus, the second substrate can no longer be held by the vacuum chuck of the upper stage. Before the second substrate 13 is dropped, however, the substrate receiver temporarily supports the second substrate.

Accordingly, the second glass substrate 13, held by the upper stage may be arranged on the substrate receiver before or during the formation of vacuum in the bonding chamber. The upper stage, which holds the second glass substrate, and the substrate receiver may be brought within a predetermined distance of each other so that the second glass substrate 13 may be safely placed on the substrate receiver from the upper stage when the bonding chamber is evacuated. Moreover, suitable mechanisms for further fastening the substrates onto the stages may be provided additionally as air flow in the chamber may shake the substrates when evacuation of the vacuum bonding chamber is initiated.

Referring to FIG. 4, once all the elements are in place as explained above, the vacuum bonding chamber 10 is evacuated (34S). The vacuum within the vacuum bonding chamber 10 may have a pressure in a first range of about $1.0 \times 10^{-3}$ Pa to 1Pa or a second range of about $1.1 \times 10^{-3}$ Pa to $10^2$ Pa. The first range may be especially applicable for an in-plane switching (IPS) mode LCD and the second range may be especially useful for a twisted nematic (TN) mode LCD. Another type of LCD called a vertical alignment (VA) mode LCD may also use these ranges.

Evacuation of the vacuum bonding chamber 10 may be carried out in two stages as follows. After the substrates are held to their respective stages, the bonding chamber door is closed and the bonding chamber 10 undergoes evacuation for the first time. After positioning the substrate receiver below the upper stage and placing the second substrate on the substrate receiver or after positioning the upper stage and the substrate receiver to within a predetermined distance where the second substrate held by the upper stage can be safely placed on the substrate receiver, the vacuum bonding chamber is further evacuated for a second time. The second evacuation is faster than the first evacuation. The vacuum force created by the first evacuation is not higher than the vacuum force needed to hold the second glass substrate onto the upper stage.

The aforementioned two stage evacuation process may minimize moving or shaking of the substrates when the vacuum bonding chamber is rapidly evacuated.

Alternatively, after the substrates are held to their respective stages and the bonding chamber door is closed, the evacuation may be implemented in a single step at a fixed rate. In addition, the substrate receiver may be arranged below the second substrate 13 prior to or at initiation of the evacuation. Before the vacuum pressure in the vacuum bonding chamber becomes higher than the vacuum needed to hold the second substrate onto the upper stage, the substrate receiver should be placed below the second glass substrate 13 to prevent the second glass substrate from falling to the lower stage if a vacuum chuck is used to hold the substrate onto the stages on the bonding chamber.

Once the vacuum bonding chamber 10 is evacuated to a preset vacuum, the upper and lower stages 15 and 16 reattach to the first and second glass substrates 11 and 13 respectively using an electrostatic charge (ESC) (35S) and the substrate receiver is removed to its original position (36S).

Using ESC the first and second glass substrates are held to their respective lower and upper stages by applying negative/positive DC voltages to two or more plate electrodes (not shown) formed within the stages. When the negative/positive voltages are applied to the plate electrodes, a force is generated between a conductive layer (e.g., transparent electrodes, common electrodes, pixel electrodes, etc.) formed on the substrates and the stages. When the conductive layer formed on the substrate faces the stage or is adjacent the stage surface, about 0.1–1KV is applied to the plate electrodes. When the conductive layer does not face the stage or is not adjacent to the stage surface, about 3–4KV is applied to the plate electrodes. An elastic sheet may be optionally provided to the upper stage.

Figure 3C:
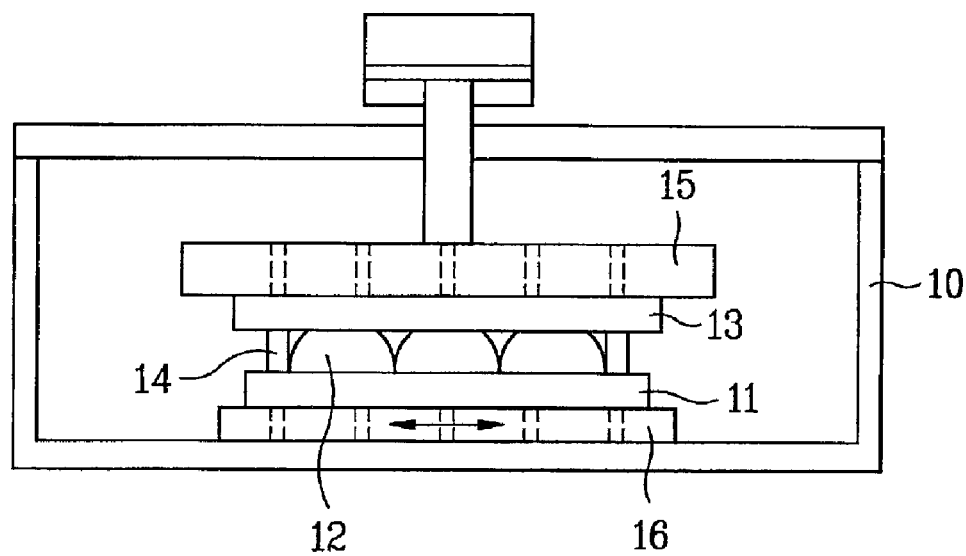
Figure 3D:
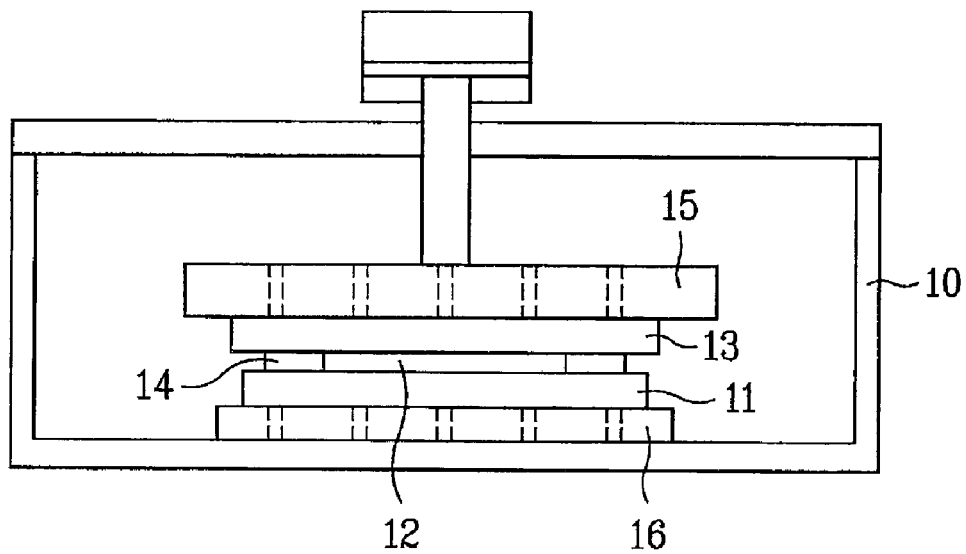

Referring to FIG. 3C, after the two glass substrates 11 and 13 are loaded on their respective stages, the two substrates are aligned and held into position by ESC for bonding of the two substrates 11 and 13 (37S). The first and second glass substrates 11 and 13 are pressed together by moving either the upper stage 15 or the lower stage 16 or both in a vertical direction, while varying speeds and the pressures at different stage locations. For example, until the time the liquid crystal 12 on the first glass substrate 11 and the seal on the second glass substrate 13 come into contact, the stages are moved at a fix speed or fixed pressure, and the pressure is increased step by step from the time of contact to a final pressure. That is, a load cell fitted to a shaft of the movable stage senses the time of contact. The two glass substrates 11 and 13 may, for example, be pressed at a pressure of 0.1 ton at the time of contact, a pressure of 0.3 ton at an intermediate stage, a pressure of 0.4 ton at an ending stage, and a pressure of 0.5 ton at a final stage (see FIG. 3D).

Although it is illustrated in the figures that the upper stage presses down toward the lower stage by means of one shaft, a plurality of shafts may independently apply and control pressure using an individual load cell. If the lower stage and the upper stage are not leveled or fail to be pressed uniformly, predetermined number of shafts may be selectively pressed using lower or higher pressures to provide uniform bonding of the seal.

Figure 3E:
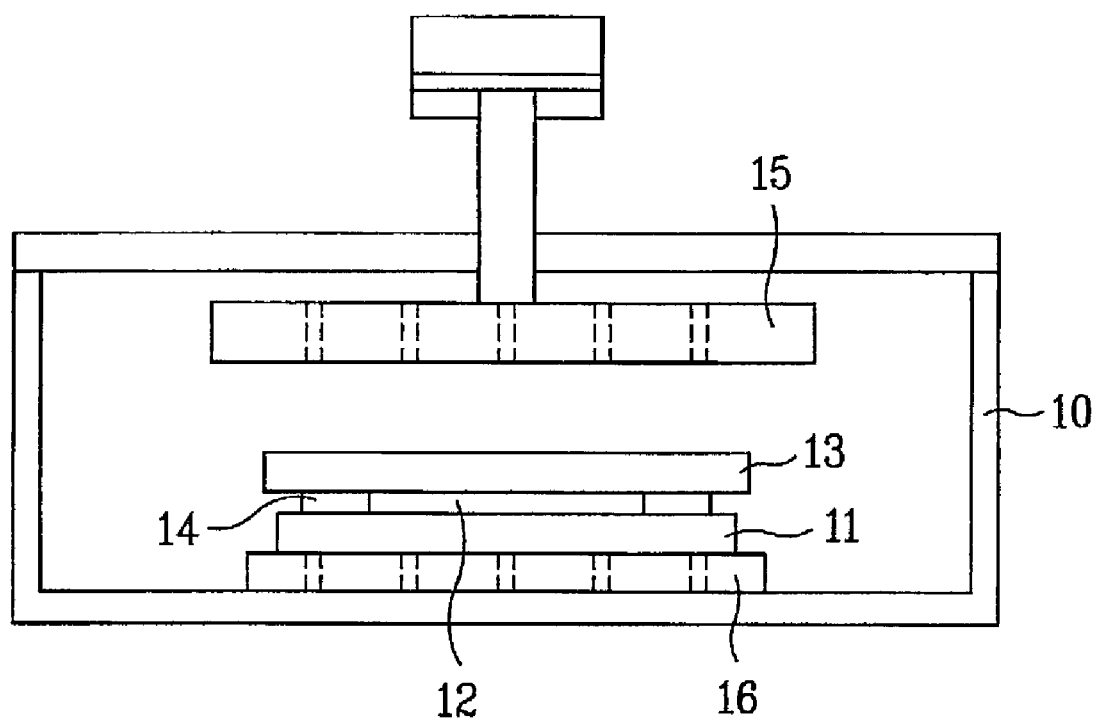

Referring to FIG. 3E, after the two substrates have been bonded, the ESC is turned off and the upper stage 15 is moved up in order to separate the upper stage 15 from the bonded substrates. Then, the bonded substrates are unloaded (38S).

As has been explained, the method for fabricating LCDs of the present invention has the following advantages.

First, applying the liquid crystal on the first substrate and coating the seal on the second substrate shorten the fabrication time prior to bonding the two substrates together.

Second, applying the liquid crystal on the first substrate and coating the seal on the second substrate permits a balanced progression of the fabrication processes for the first and second substrates, thereby making efficient use of the production line.

Third, by applying the liquid crystal on the first substrate and not applying liquid crystal on the second substrate, contamination is reduced as the substrate having the sealant coated thereon can be cleaned by USC prior to bonding.

Fourth, positioning the substrate receiver under the substrate and evacuation of the vacuum bonding chamber permits the substrate held by the upper stage from falling and breaking.

Fifth, sensing the time during which the two substrates come into contact and varying the pressure when bonding the two substrates minimizes damage made by the liquid crystal to the orientation film.

Sixth, since the upper stage presses the substrate down by means of a plurality of shafts, each of which is capable of applying pressure independently, uniform bonding of the sealant can be achieved by independently applying lower or higher pressures by predetermined shafts when the lower stage and the upper stage are not level or fail to bond to the sealant uniformly.

Seventh, the two staged evacuation of the vacuum bonding chamber minimizes moving or shaking of the substrates from the air flow in the chamber caused by a sudden pressure change.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating an LCD, comprising:
    loading a first substrate and a second substrate onto predetermined ones of a lower stage and an upper stage within a bonding chamber, wherein liquid crystal is arranged on the first substrate and sealant is coated on the second substrate;
    bonding the first and second substrates by varying a pressure that is continuously applied along a vertical direction; and
    unloading the bonded first and second substrates,
    wherein the loading comprises:
        holding the first and second substrates to lower and upper stages, respectively;
        bringing a substrate receiver into contact with a bottom surface of the second substrate;
        evacuating the bonding chamber; and
        holding the first and second substrates at the stages by an electrostatic charge (ESC), respectively, and
        wherein the bonding chamber is evacuated in at least two stages, said evacuating comprising:
            a first stage evacuation after the first and second substrates are held to the lower and upper stages, respectively; and
    a second stage evacuation after the substrate receiver is arranged below the second substrate.

2. The method of claim 1, wherein applying ESC includes applying 0.1 to 1 KV to at least one of the first and second substrates.

3. The method of claim 2, wherein the at least one of the first and second substrates includes a conductive layer adjacent a surface of a corresponding one of the lower and upper stages.

4. The method of claim 1, wherein applying ESC includes applying 3 to 4 KV to at least one of the first and second substrates.

5. The method of claim 1, wherein holding the first and second substrates comprises:
    inserting the second substrate in the bonding chamber with the sealant facing downward;
    placing the second substrate on a surface of the upper stage, the upper stage immovably holding the second substrate onto the surface;
    moving the upper stage vertically upward; and
    positioning the first substrate on the lower stage.

6. The method of claim 1, wherein the first and second substrates are held to the lower and upper stages by vacuum, respectively.

7. The method of claim 1, wherein the first and second substrates are held to the lower and upper stages by electrostatic charge, respectively.

8. The method of claim 1, wherein bringing the substrate receiver into contact with the bottom surface of the second substrate includes moving the upper stage down to the substrate receiver.

9. The method of claim 1, wherein the substrate receiver is moved vertically upward to the upper stage.

10. The method of claim 1, wherein, evacuating the bonding chamber evacuates bonding chamber to about $1.0 \times 10^{-3}$ to 1 Pa.

11. The method of claim 10, wherein the LCD is an in-plane switching mode LCD.

12. The method of claim 1, wherein, evacuating the bonding chamber evacuates bonding chamber to about $1.1 \times 10^{-3}$ to $10^2$ Pa.

13. The method of claim 12, wherein the LCD is a twisted nematic mode.

14. The method of claim 1, wherein loading the substrates comprises:
   securing the first substrate and the second substrate to the lower stage and the upper stage by electrostatic charge, respectively; and
   evacuating the bonding chamber.

15. The method of claim 1, wherein loading the substrates comprises:
   loading the first substrate having liquid crystal applied thereon to the lower stage in the bonding chamber; and
   loading the second substrate having sealant coated thereon to the upper stage of the bonding chamber.

16. The method of claim 1, wherein bonding the first and second substrates includes moving at least one of the upper and lower stages to the other.

17. The method of claim 16, wherein the at least one of the upper and lower stages moves at a fixed speed for a first time period and then moves at varying speeds after the first time period.

18. The method of claim 1, wherein bonding includes pressing the upper stage by using multiple shafts.

19. The method of claim 1, wherein bonding comprises moving the upper stage down and pressing the substrate by using a plurality of shafts, each of the shafts having an individual load cell for independent pressure sensing.

20. The method of claim 1, wherein the second substrate is cleaned prior to loading into the bonding chamber.

21. The method of claim 20, wherein the second substrate is cleaned by an ultrasonic cleaner (USC).

22. The method of claim 1, wherein bonding includes applying a first pressure of about 0.1 ton or greater at a first stage and a second pressure of about 0.3 ton or greater at a second stage.

23. The method of claim 1, wherein bonding comprises:
   applying a first pressure of about 0.1 ton for a first time period to the first and second substrates;
   applying a second pressure of about 0.3 ton for a second time period to the first and second substrates;
   applying a third pressure of about 0.4 ton for a third time period to the first and second substrates; and
   applying a fourth pressure of about 0.5 ton for a fourth time period to the first and second substrates.

24. The method as claimed in claim 1, wherein the substrate receiver contacts the second substrate at multiple parts at a center area of the second substrate.

25. The method as claimed in claim 1, wherein the substrate receiver contacts the second substrate at dummy areas between panels formed on the second substrate.

26. The method as claimed in claim 1, wherein evacuating in the two stages includes dry pumping and turbo molecular pumping (TMP).

27. The method as claimed in claim 26, wherein the dry pumping includes slow pumping and fast pumping.

28. The method of claim 1, further comprising:
   aligning the first and second substrates with respect to each other;
   moving the first and second substrates closer to each other until the sealant contacts the first substrate; and
   increasing the applied pressure from the time when the sealant contacts the first substrate.

29. The method of claim 1, wherein the moving of the first and second substrates is at a substantially constant speed until the sealant contacts the first substrate.

30. A method for fabricating a liquid crystal display device comprising:
   loading a first substrate and a second substrate into a bonding chamber, the loading including holding the first and second substrates to predetermined ones of a lower stage and an upper stage within the bonding chamber, wherein liquid crystal is dropped on the first substrate;
   bonding the first and second substrates together by applying at least two different pressures at different distances between the first and second substrates, wherein the at least two different pressures are consecutively and vertically applied; and
   unloading the bonded first and second substrates,
   wherein the loading comprises:
      holding the first and second substrates to lower and upper stages, respectively;
      bringing a substrate receiver into contact with a bottom surface of the second substrates;
      evacuating the bonding chamber; and
      holding the first and second substrates at the stages by an electrostatic charge (ESC), respectively, and
      wherein the bonding chamber is evacuated in at least two stages, said evacuating comprising:
         a first stage evacuation after the first and second substrates are held to the lower and upper stages, respectively; and
         a second stage evacuation after the substrate receiver is arranged below the second substrate.

31. A method for fabricating an LCD, comprising:
   loading a first substrate and a second substrate, wherein a fixed spacer is formed on at least one of the first and second substrates, wherein liquid crystal is arranged on the first substrate, and wherein sealant is coated on the second substrate, the loading including holding the first and second substrates to predetermined ones of a lower stage and an upper stage within the bonding chamber;
   bonding the first and second substrates by varying an applied pressure; and
   unloading the bonded first and second substrates,
   wherein the loading comprises:
      holding the first and second substrates to lower and upper stages, respectively;
      bringing a substrate receiver into contact with a bottom surface of the second substrates;
      evacuating the bonding chamber; and
      holding the first and second substrates at the stages by an electrostatic charge (ESC), respectively, and
      wherein the bonding chamber is evacuated in at least two stages, said evacuating comprising:

a first stage evacuation after the first and second substrates are held to the lower and upper stages, respectively; and a second stage evacuation after the substrate receiver is arranged below the second substrate.

32. The method of claim 31, wherein the fixed spacer is a column spacer.

33. A method for fabricating an LCD, comprising:

loading a first substrate having liquid crystal arranged thereon and a second substrate having sealant coated thereon into a bonding chamber;

bonding the first and second substrates by applying at least two different pressures substantially evenly across the surface of the first and second substrates, wherein the at least two different pressures are consecutively and vertically applied; and unloading the bonded first and second substrates, wherein the loading comprises:

holding the first and second substrates to lower and upper stages, respectively;

bringing a substrate receiver into contact with a bottom surface of the second substrates;

evacuating the bonding chamber; and holding the first and second substrates at the stages by an electrostatic charge (ESC), respectively, and wherein the bonding chamber is evacuated in at least two stages, said evacuating comprising:

a first stage evacuation after the first and second substrates are held to the lower and upper stages, respectively; and a second stage evacuation after the substrate receiver is arranged below the second substrate.

34. A method for fabricating a liquid crystal display device comprising:

loading a first substrate having liquid crystal dropped thereon and a second substrate on a bonding chamber;

bonding the first and second substrates together by applying at least two different pressures at different distances between the first and second substrates, wherein the two different pressures are applied substantially evenly across the surface of the first and second substrates, and wherein the two different pressures are applied consecutively along a vertical direction; and unloading the bonded first and second substrates, wherein the loading comprises:

holding the first and second substrates to lower and upper stages, respectively;

bringing a substrate receiver into contact with a bottom surface of the second substrates;

evacuating the bonding chamber; and holding the first and second substrates at the stages by an electrostatic charge (ESC), respectively, and wherein the bonding chamber is evacuated in at least two stages, said evacuating comprising:

a first stage evacuation after the first and second substrates are held to the lower and upper stages, respectively; and a second stage evacuation after the substrate receiver is arranged below the second substrate.

* * * * *